(12) United States Patent
Xie (10) Patent No.: US 10,862,588 B1
(45) Date of Patent: Dec. 8, 2020

(54) DENSE WAVELENGTH DIVISION AND MULTIPLEXING SCHEME FOR OPTICAL INTEGRATED CIRCUITS

(71) Applicant: XILINX, INC., San Jose, CA (US)

(72) Inventor: Chuan Xie, Fremont, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/448,736

(22) Filed: Jun. 21, 2019

(51) Int. Cl.
*H04B 10/27* (2013.01)
*H04B 10/516* (2013.01)
*H04J 14/02* (2006.01)

(52) U.S. Cl.
CPC .......... *H04B 10/516* (2013.01); *H04B 10/27* (2013.01); *H04J 14/0283* (2013.01)

(58) Field of Classification Search
CPC .. H04B 10/516; H04B 10/671; H04B 10/677; H04J 14/02
See application file for complete search history.

(56) References Cited

U.S. PATENT DOCUMENTS

| | | | |
|---|---|---|---|
| 7,539,418 B1 | 5/2009 | Krishnamoorthy et al. | |
| 2011/0280579 A1 | 11/2011 | McLaren et al. | |
| 2016/0006533 A1 | 1/2016 | Jeong | |
| 2016/0211921 A1* | 7/2016 | Welch | H04B 10/516 |
| 2017/0214472 A1* | 7/2017 | Caplan | H04J 14/02 |
| 2018/0054257 A1* | 2/2018 | Witzens | H04B 10/038 |
| 2018/0083599 A1* | 3/2018 | Kippenberg | H04B 10/506 |
| 2018/0098138 A1 | 4/2018 | Frankel et al. | |

OTHER PUBLICATIONS

Ding, R. et al., "A Compact Low-Power 320-Gb/s WDM Transmitter Based on Silicon Microrings", IEEE Photonics Journal, WDM Transmitter Based on Silicon Microrings, Jun. 2014, 9 pages, vol. 6, No. 3., No. 6600608.
Manipatruni, S. et al., "Ultra high bandwidth WDM using silicon microring modulators", Optics Express, Aug. 2, 2010, 10 pages, vol. 18, No. 16., No. 16858.
UFP Interleave, GouMax Technology, (https://www.goumax.com/USP_Interleaver.htm, accessed May 15, 2020.
Optoplex Optical Interleavers, https://www.optoplex.com/download/Optoplex%20Optical%20Interleaver%20Brochure%20Rev1.1pdf, accessed May 15, 2020.

* cited by examiner

*Primary Examiner* — Dzung D Tran
(74) *Attorney, Agent, or Firm* — Patterson + Sheridan, LLP (57) ABSTRACT

An apparatus and method for generating a dense wavelength division and multiplexing (DWDM) optical stream in a photonic integrated circuit (PIC) is disclosed. An optical input source including a number (N) of optical channels (wavelengths) may be separated (de-interleaved) into multiple optical streams, each including a corresponding subset of the optical channels of the optical input source. Each of the multiple split optical streams may be modulated with an associated set of data streams by silicon-based micro-ring modulators to generate a corresponding modulated optical stream. A first pair of the modulated optical streams may be combined (interleaved) to generate a first optical output stream including N/2 modulated optical channels, and a second pair of the modulated optical streams may be combined (interleaved) to generate a second optical output stream including N/2 modulated optical channels. The channel spacing of the first and second optical output streams may be twice the channel spacing of the optical input source.

20 Claims, 7 Drawing Sheets

DENSE WAVELENGTH DIVISION AND MULTIPLEXING SCHEME FOR OPTICAL INTEGRATED CIRCUITS

TECHNICAL FIELD

Aspects of the present disclosure relate generally to optical integrated circuits, and specifically to a dense wavelength division and multiplexing scheme for transmitting and receiving optical signals.

BACKGROUND

Optical interconnect technology may be used to provide high-speed, low power consumption input/output (I/O) interfaces for integrated circuits. As the complexity and density of integrated circuits increase, bandwidth demands placed upon optical I/O interfaces also increase. For example, some integrated circuits may contain hundreds or even thousands of optical I/O interfaces to meet bandwidth demands. Each optical I/O interface typically requires a photonic I/O cell to terminate a corresponding optical fiber, and thus hundreds or thousands of optical fibers may be needed to meet the bandwidth demands. It may be impractical to fit hundreds or thousands of optical fibers in an IC package.

Some integrated circuits may use silicon-based optical ring modulators to modulate data for the optical I/O interfaces. The silicon-based optical ring modulators typically have a fixed free spectral range (FSR) and a minimum channel spacing that may limit the number of optical channels that can be supported within a given fiber, which undesirably limits channel density. Therefore, there is a need for a more efficient use of the fiber bandwidth so that the number of optical fibers and corresponding photonic I/O cells needed to support a given I/O bandwidth may be reduced.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented in an optical modulation circuit to generate a dense wavelength division and multiplexing (DWDM) modulated optical stream. In some embodiments, an optical modulation circuit may include an input terminal, a first channel de-interleaver, a second channel de-interleaver, a first micro-ring modulator (MRM) array, a second MRM array, and a first optical interleaver. The input terminal may receive an optical input source including a plurality of optical channels or wavelengths. The first channel de-interleaver may be configured to separate the optical input source into first and second optical streams, and the second channel de-interleaver may be configured to separate the first optical stream into first and second separated optical streams. The first MRM array may be configured to modulate a first set of data streams onto optical channels of the first separated optical stream to generate a first modulated optical stream, and the second MRM array may be configured to modulate a second set of data streams onto optical channels of the second separated optical stream to generate a second modulated optical stream. The first optical interleaver may be configured to generate a first optical output stream based on the first and second modulated optical streams. In some aspects, the first optical stream includes odd numbered optical channels of the optical input source, and the second optical stream includes even numbered optical channels of the optical input source. In addition, or in the alternative, the first separated optical stream includes a first set of alternating optical channels of the first optical stream, and the second separated optical stream includes a second set of alternating optical channels of the first optical stream, wherein the first set of alternating optical channels is different than the second set of alternating optical channels.

The optical modulation circuit may also include a third channel de-interleaver, a third MRM array, a fourth MRM array, and a second optical interleaver. The third channel de-interleaver may be configured to separate the second optical stream into third and fourth separated optical streams. The third MRM array may be configured to modulate a third set of data streams onto optical channels of the third separated optical stream to generate a third modulated optical stream, and the fourth MRM array configured to modulate a fourth set of data streams onto optical channels of the fourth separated optical stream to generate a fourth modulated optical stream. The second optical interleaver may be configured to generate a second optical output stream based on the third and fourth modulated optical streams.

Another innovative aspect of the subject matter described in this disclosure can be implemented in a photonics integrated circuit. The photonics integrated circuit may include a plurality of optical modulation circuits and a plurality of optical detection circuits. Each optical modulation circuit may include an input terminal to receive a plurality of optical channels or wavelengths from an optical source. Each optical detection circuit may have an input terminal to receive a plurality of modulated optical channels from an external source. In some embodiments, each of the optical modulation circuits may include a first channel de-interleaver, a second channel de-interleaver, a third channel de-interleaver, a plurality of micro-ring modulation (MRM) arrays, a first optical interleaver, and a second optical interleaver. The first channel de-interleaver may be configured to separate the optical input source into first and second optical streams, the second channel de-interleaver may be configured to separate the first optical stream into first and second separated optical streams, and the third channel de-interleaver configured to separate the second optical stream into third and fourth separated optical streams. Each of the plurality of MRM arrays may be configured to modulate a unique set of data streams onto optical channels of a corresponding one of the separated optical streams to generate a respective one of a first modulated optical stream, a second modulated optical stream, a third modulated optical stream, and a fourth modulated optical stream. The first optical interleaver may be configured to generate a first optical output stream based on the first and second modulated optical streams, and the second optical interleaver may configured to generate a second optical output stream based on the third and fourth modulated optical streams.

In some embodiments, the first separated optical stream includes a first set of alternating optical channels of the first optical stream, the second separated optical stream includes a second set of alternating optical channels of the first optical stream, the third separated optical stream includes a first set of alternating optical channels of the second optical stream, and the fourth separated optical stream includes a second set of alternating optical channels of the second optical stream. In some aspects, the first optical stream includes odd numbered optical channels of the optical input source, and the second optical stream includes even numbered optical channels of the optical input source.

Another innovative aspect of the subject matter described in this disclosure can be implemented as a method. In some embodiments, the method may include separating an optical input source into a first optical stream and a second optical stream; separating the first optical stream into a first separated optical stream and a second separated optical stream; modulating a first set of data streams onto optical channels of the first separated optical stream to generate a first modulated optical stream; modulating a second set of data streams onto optical channels of the second separated optical stream to generate a second modulated optical stream; and generating a first optical output stream based on a combination of the first modulated optical stream and the second modulated optical stream. In some aspects, the first optical stream includes odd numbered optical channels of the optical input source, and the second optical stream includes even numbered optical channels of the optical input source. In addition, or in the alternative, the first separated optical stream includes a first set of alternating optical channels of the first optical stream, and the second separated optical stream includes a second set of alternating optical channels of the first optical stream, wherein the first set of alternating optical channels is different than the second set of alternating optical channels.

The method may also include separating the second optical stream into a third separated optical stream and a fourth separated optical stream; modulating a third first set of data streams onto optical channels of the third separated optical stream to generate a third modulated optical stream; modulating a fourth set of data streams onto optical channels of the fourth separated optical stream to generate a fourth modulated optical stream; and generating a second optical output stream based on a combination of the third modulated optical stream and the fourth modulated optical stream.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Energy-efficient photonics integrated circuits (PICs) may be used to meet the ever increasing input/output (I/O) bandwidth requirements of large scale data processing circuits, such as those deployed in next-generation data centers, which may exceed one hundred Tera-bits per second (Tbps). A photonics IC is typically coupled to each of a number of optical fibers using a corresponding photonic I/O cell that provides an interface between the optical fiber and optical circuitry provided within the photonics IC. The photonics IC may use wavelength-division multiplexing (WDM) to place multiple optical wavelengths on each optical fiber, thereby reducing the number of optical fibers needed to achieve a given bandwidth, for example, so that the perimeter of the photonics IC may physically accommodate the optical fibers and their corresponding photonic I/O cells. A plurality of micro-ring modulators coupled to a common bus waveguide with staggered resonance matching the channel wavelengths carried in the bus waveguide may be used to modulate data onto multiple wavelengths by having a plurality of micro-rings. However, the number of channels provided within each optical waveguide is limited by the free spectral range (FSR) of the micro-ring modulators. In addition, optical signals typically require a minimum channel spacing to avoid cross-talk and other interference between adjacent channels, which may also limit the number of channels that can be provided on each optical signal.

Implementations of the subject matter described in this disclosure may be used to increase the number of optical channels provided on an optical fiber beyond the limits typically imposed by micro-ring modulators. In accordance with various aspects of the present disclosure, a photonics IC may include a plurality of optical modulation circuits that can increase the number of optical channels provided on a given optical fiber by using a dense wavelength division and multiplexing (DWDM) scheme to modulate data onto a plurality of optical channels of one or more optical signals. In some implementations, each optical modulation circuit may receive an optical input source including a number (N) of optical wavelengths, and may separate the optical input source into multiple optical streams, each including a corresponding subset of wavelengths of the optical input source. Each of the multiple separated optical streams may be modulated with a plurality of data streams by a corresponding plurality of micro-ring modulators to generate a corresponding modulated optical stream. A first pair of the modulated optical streams may be combined to generate a first optical output stream including a first set of N/2 modulated optical channels, and a second pair of the modulated optical streams may be combined to generate a second optical output stream including a second set of N/2 modulated optical channels.

In some implementations, the optical input source may include 32 wavelengths (frequencies) in the O-band (near 1310 nm) with a channel spacing of approximately 65 GHz, and a first channel de-interleaver may separate the optical input source into first and second optical streams. The first optical stream may include the sixteen odd numbered channels of the optical input source and may have a channel spacing of approximately 130 GHz, and the second optical stream may include the sixteen even numbered channels of the optical input source and may have a channel spacing of approximately 130 GHz. A second channel de-interleaver may separate the first optical stream into first and second separated optical streams, and a third channel de-interleaver may separate the second optical stream into third and fourth separated optical streams. The first separated optical stream may be modulated with a first set of data streams by a first MRM array coupled to a first waveguide carrying these channels to generate a first modulated optical stream. The second separated optical stream on a second waveguide may be modulated with a second set of data streams by a second MRM array coupled to the second waveguide to generate a second modulated optical stream. The third separated optical stream on a third waveguide may be modulated with a third set of data streams by a third MRM array coupled to the third waveguide to generate a third modulated optical stream. The fourth separated optical stream on a fourth waveguide may be modulated with a fourth set of data streams by a fourth MRM array coupled to the fourth waveguide to generate a fourth modulated optical stream. In some aspects, each of the first, second, third, and fourth modulated optical streams may include a corresponding set of eight wavelengths with a channel spacing of approximately 260 GHz.

The first and second modulated optical streams may be combined in a first optical interleaver to generate a first optical output stream, and the third and fourth modulated optical streams may be combined in a second optical interleaver to generate a second optical output stream. Each of the first and second optical output streams may include sixteen optical channels and may have a channel spacing of approximately 130 GHz, which is twice the channel spacing of the optical input source. Combining the channels further may not be desirable because for the targeted modulation speed, which may exceed 50 Giga Baud, smaller channel spacing may cause the spectra of modulated channels to overlap, which in turn may cause signal degradation.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example implementations. However, it will be apparent to one skilled in the art that these specific details may not be required to practice the example implementations. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example implementations are not to be construed as limited to specific examples described herein but rather to include within their scope all implementations defined by the appended claims.

Figure 1:
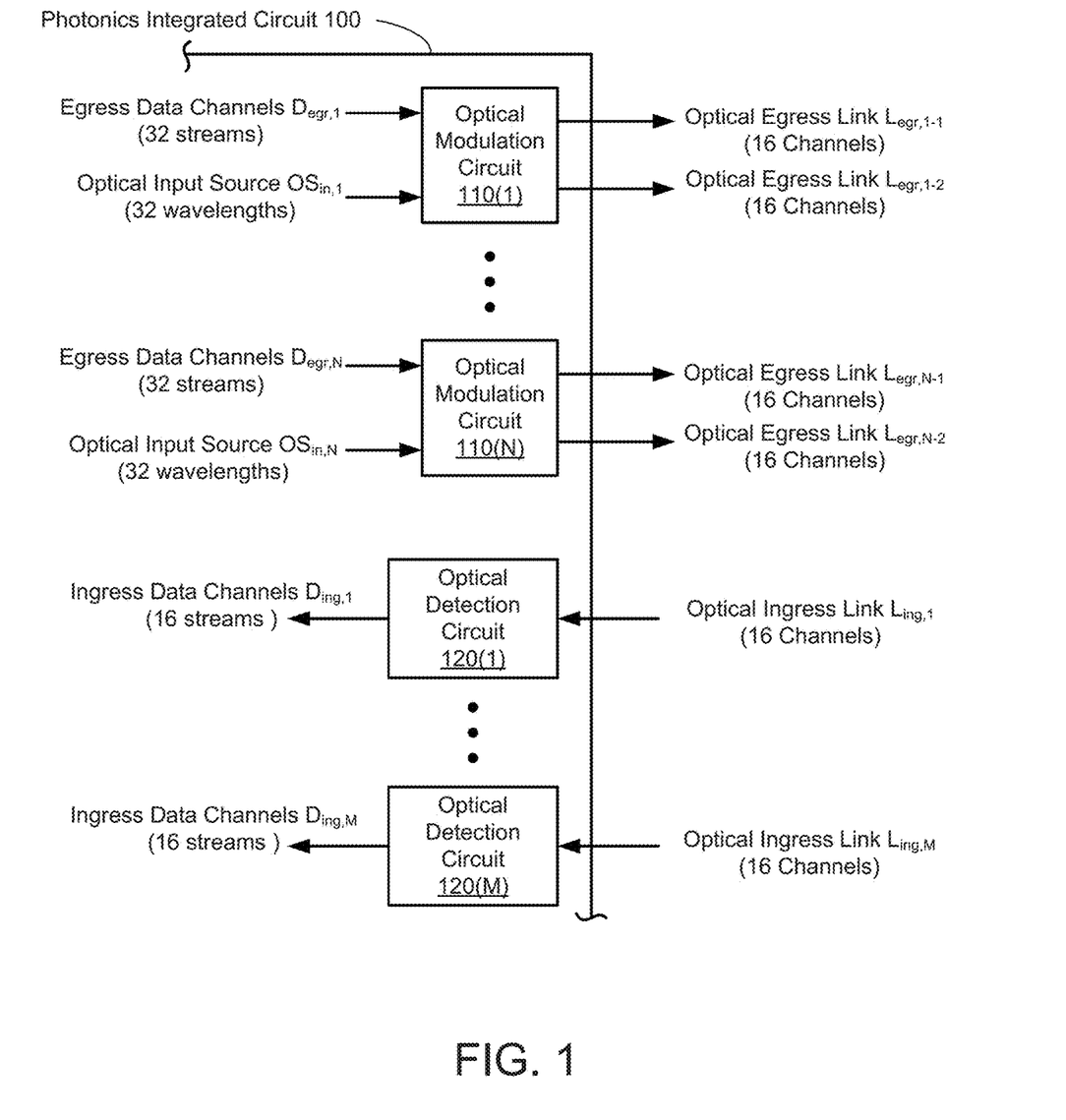
FIG. 1 is a block diagram of an example photonics integrated circuit, in accordance with some implementations.

FIG. 1 is a block diagram of a portion of an example photonics integrated circuit (IC) 100, in accordance with some implementations. The photonics IC 100 may include a first number (N) of optical modulation circuits 110(1)-110(N) and a second number (M) of optical detection circuits 120(1)-120(M), where each of the first number N and the second number M may be any suitable non-zero integers. Each of the optical modulation circuits 110(1)-110(N) may include an electrical input coupled to a plurality of egress data channels ($D_{egr}$), may include an optical input coupled to an optical input source ($OS_{in}$), and may include optical outputs coupled to a pair of optical egress links ($L_{egr}$). Although not shown in FIG. 1 for simplicity, each of the optical modulation circuits 110(1)-110(N) may be coupled to an associated optical input source $OS_{in}$ by a first photonic I/O cell, and may be coupled to an associated pair of optical egress links $L_{egr}$ by second and third photonic I/O cells. The optical input source $OS_{in}$ may be integrated on the photonics IC 100, or may be received via an optical fiber external to the photonics IC 100.

In some implementations, each of the optical modulation circuits 110(1)-110(N) may receive a plurality of data streams provided on the associated input data channels (DO, may receive an optical input from an optical input source ($OS_{in}$), and may be configured to modulate the optical input with the plurality of received data streams to generate one or more modulated optical signals containing data associated with the plurality of received data streams. In some aspects, each of the optical modulation circuits 110(1)-110(N) may include a plurality of micro-ring modulators (not shown in FIG. 1 for simplicity) to module the optical input with data associated with the corresponding plurality of received data streams. The one or more modulated optical signals generated by each of the optical modulation circuits 110(1)-110(N) may be provided to a corresponding pair of optical egress links $L_{egr}$ for transmission to one or more other circuits or devices (not shown for simplicity).

In the example implementation of FIG. 1, each of the optical modulation circuits 110(1)-110(N) may receive thirty-two independent data streams via thirty-two associated egress (or transmitting) data channels ($D_{egr}$), may receive unmodulated light having thirty-two evenly spaced wavelengths from the associated optical input source $OS_{in}$, and may modulate the thirty-two independent data streams onto corresponding wavelengths of the received optical input source using a plurality of micro-ring modulators. In some implementations, each of the optical modulation circuits 110(1)-110(N) may combine groups of sixteen modulated optical channels for transmission through one optical egress link $L_{egr}$, which may allow each of the optical modulation circuits 110(1)-110(N) of FIG. 1 to modulate and combine thirty-two optical channels for transmission on a corresponding pair of optical egress (or transmitting) links $L_{egr}$. For example, the first optical modulation circuit 110(1) may modulate thirty-two independent data streams received via a first set of egress data channels $D_{egr,1}$ onto the optical input provided by the first optical source $OS_{in,1}$, and may generate two groups of modulated optical signals for transmission on a corresponding pair of optical egress links $L_{egr,1-1}$ and $L_{egr,2-1}$. Similarly, the Nth optical modulation circuit 110(N) may modulate thirty-two independent data streams received via an Nth set of egress data channels $D_{egr,N}$ onto the optical input provided by the Nth optical input source $OS_{in,N}$, and may generate two groups of modulated optical signals for transmission on a corresponding pair of optical egress links $L_{egr,N-1}$ and $L_{egr,N-2}$.

In other implementations, each of the optical modulation circuits 110(1)-110(N) may receive other suitable numbers of data streams and optical wavelengths, may be coupled to other numbers of optical links, and/or may include other circuitry suitable for modulating and combining a plurality of optical channels for transmission through one or more optical egress links.

Each of the optical detection circuits 120(1)-120(M) may include an optical input coupled to an associated optical ingress link ($L_{ing}$), and may include electrical outputs coupled to a number of ingress data channels ($D_{ing}$). Although not shown in FIG. 1 for simplicity, each of the optical detection circuits 120(1)-120(M) may be coupled to an associated optical ingress link $L_{ing}$ by corresponding photonic I/O cell. In some implementations, each of the optical detection circuits 120(1)-120(M) may receive a modulated optical signal provided on the associated optical ingress link $L_{ing}$, and may be configured to demodulate the received modulated optical signal to decode data embodied in the received modulated optical signal. In some aspects, each of the optical detection circuits 120(1)-120(M) may provide the received data to the associated ingress data channels $D_{ing}$ as a plurality of data streams.

In the example implementation of FIG. 1, each of the optical detection circuits 120(1)-120(M) may receive a modulated optical signal having sixteen channels, and may be configured to demodulate the received optical signal to generate sixteen data streams for output onto a corresponding set of ingress data channels $D_{ing}$. In some aspects, each of the sixteen data streams may include data extracted from a corresponding one of the sixteen channels of the modulated optical signal received from the associated optical ingress link $L_{ing}$. For example, the first optical detection circuit 120(1) may demodulate data encoded onto sixteen channels of the optical signal received from the first optical ingress link $L_{ing,1}$ to generate sixteen separate data streams for output onto the first set of ingress data channels $D_{ing,1}$, and so on, where the Mth optical demodulation circuit 120(M) may demodulate data encoded onto sixteen channels of the optical signal received from the Mth optical ingress link $L_{ing,M}$ to generate sixteen separate data streams for output onto the Mth set of ingress data channels $D_{ing,M}$.

Figure 2A:
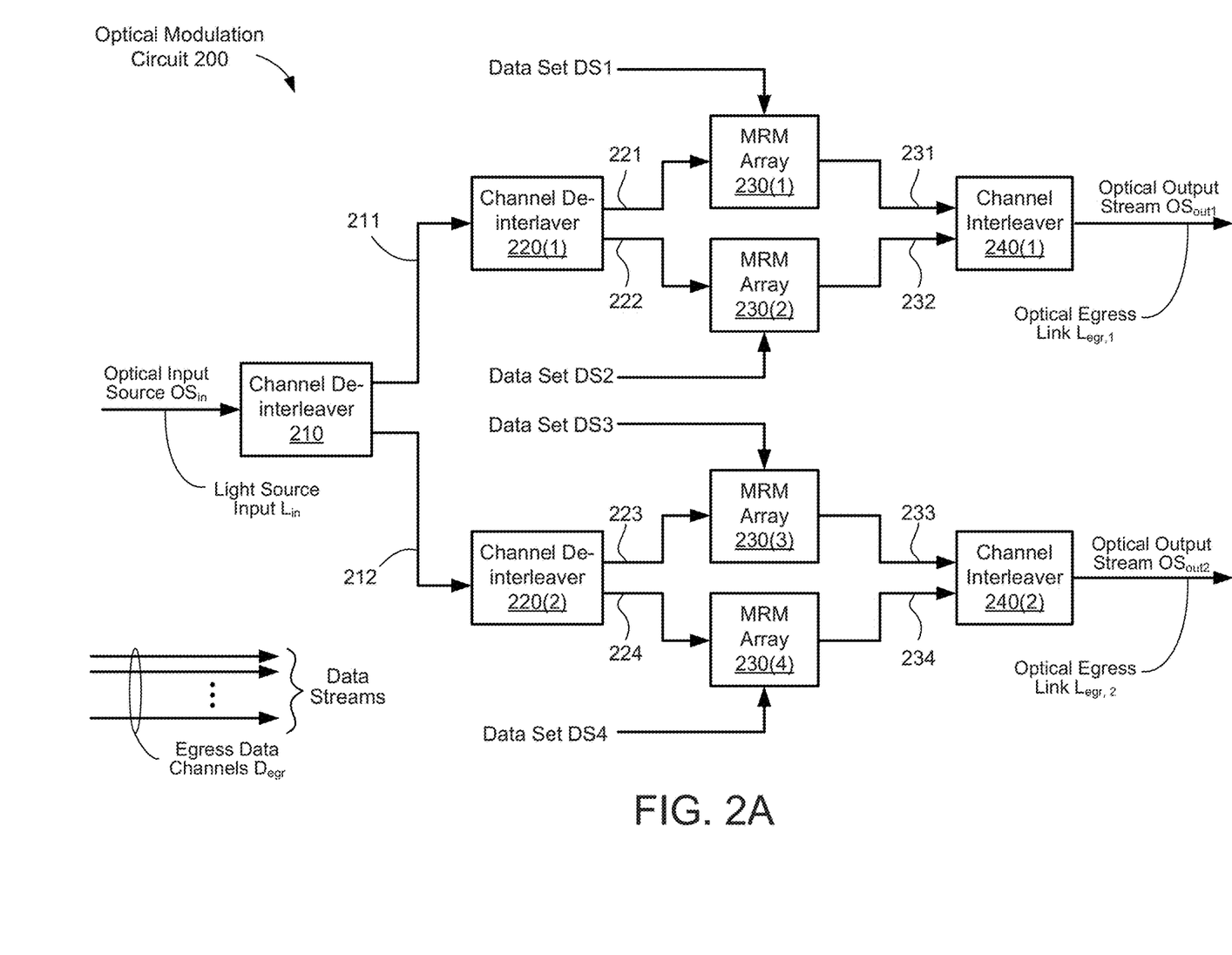
FIG. 2A is a block diagram of an example optical modulation circuit, in accordance with some implementations.

FIG. 2A is a block diagram of an example optical modulation circuit 200, in accordance with some implementations. The optical modulation circuit 200, which may be one example of the optical modulation circuits 110(1)-110(N) of FIG. 1, may include a first input to receive an optical input source OS from an associated optical source $L_{in}$, may include a second input to receive a plurality of data streams provided as data sets DS1-DS4 from associated egress data channels $D_{egr}$, and may include outputs to provide two optical output streams $OS_{out1}$ and $OS_{out2}$ on respective optical egress links $L_{egr,1}$ and $L_{egr,2}$. In the example of FIG. 2A, the optical modulation circuit 200 is shown to include a first channel de-interleaver 210, a pair of second channel de-interleavers 220(1)-220(2), a number of micro-ring modulator (MRM) arrays 230(1)-230(4), and a number of optical interleavers 240(1)-240(2). The first channel de-interleaver 210 includes an input to receive the optical input source includes a first output coupled to channel de-interleaver 220(1), and includes a second output coupled to channel de-interleaver 220(2). The channel de-interleaver 220(1) includes a first output coupled to the first MRM array 230(1), and includes a second output coupled to the second MRM array 230(2). The channel de-interleaver 220(2) includes a first output coupled to the third MRM array 230(3), and includes a second output coupled to the fourth MRM array 230(4). Each of the first and second MRM arrays 230(1)-230(2) includes an output coupled to the first optical channel interleaver 240(1), and each of the third and fourth MRM arrays 230(3)-230(4) includes an output coupled to the second optical channel interleaver 240(2). The first optical channel interleaver 240(1) includes an output coupled to the first optical egress link $L_{egr,1}$, and the second optical channel interleaver 240(2) includes an output coupled to the second optical egress link $L_{egr,2}$.

The optical input source $OS_{in}$ may provide a plurality optical wavelengths upon which a corresponding plurality of data streams may be modulated. Each of the optical egress links $L_{egr,1}$ and $L_{egr,2}$ may provide a plurality optical channels upon which a corresponding plurality of optical signals may be transmitted. In accordance with various aspects of the present disclosure, the optical modulation circuit 200 may be configured to encode optical signals on each of the optical wavelengths of the optical input source with data associated with a corresponding data stream to generate a number of modulated optical channels that can be transmitted via the egress optical links $L_{egr,1}$ and $L_{egr,2}$. In some implementations, the optical input source $OS_{in}$ may provide thirty-two wavelengths upon which thirty-two independent data streams may be modulated by the optical modulation circuit 200, and the egress data channels $D_{egr}$ may provide thirty-two channels upon which up to thirty-two independent data streams may be received by the optical modulation circuit 200. In such implementations, the optical modulation circuit 200 may be configured to modulate each of the thirty-two input optical wavelengths with data from a corresponding data stream to generate two groups of modulated optical signals for transmission on the optical egress links $L_{egr,1}$ and $L_{egr,2}$. In some aspects, the optical modulation circuit 200 may be configured to combine a first group of sixteen modulated optical signals for transmission as the first optical output stream $OS_{out1}$ on the first optical egress link $L_{egr,1}$, and may be configured to combine a second group of sixteen modulated optical signals for transmission as the second optical output stream $OS_{out2}$ on the second optical egress link $L_{egr,2}$.

Each of the optical channels associated with the optical input source $OS_{in}$ may be characterized by a distinct wavelength, and may be spaced from adjacent optical channels by certain channel spacing. Similarly, each of the optical channels associated with the optical egress links $L_{egr,1}$ and $L_{egr,2}$ may be characterized by a distinct wavelength, and may be spaced from adjacent optical channels by a certain channel spacing. In some implementations, the optical input source $OS_{in}$ may provide thirty-two independent optical wavelengths with a channel spacing of approximately 65 GHz, and each of the first and second optical egress links $L_{egr,1}$ and $L_{egr,2}$ may provide sixteen independent optical channels with a channel spacing of approximately 130 GHz.

In an example operation, the first channel de-interleaver 210 may separate the received optical input source $OS_{in}$ to generate a first optical stream 211 and a second optical stream 212. In some implementations, the first optical stream 211 may include the "odd" numbered optical channels of the optical input source $OS_{in}$, and the second optical stream 212 may include the "even" numbered optical channels of the optical input source $OS_{in}$. For example, in implementations for which the optical input source $OS_{in}$ includes thirty-two optical channels CH1-CH32, the first optical stream 211 may include the odd numbered optical channels CH1, CH3, CH5, and so on, to CH31 of the optical input source $OS_{in}$, and the second optical stream 212 may include the even numbered optical channels CH2, CH4, CH6, and so on, to CH32 of the optical input source $OS_{in}$. By separating the optical input source $OS_{in}$ such that each of the first optical stream 211 and the second optical stream 212 includes alternate optical channels of the optical input source $OS_{in}$, the channel spacing within each of the first optical stream 211 and the second optical stream 212 may be twice the channel spacing of the optical input source $OS_{in}$. Thus, for implementations in which the channel spacing of the optical input source $OS_{in}$ is approximately 65 GHz, the channel spacing within each of the first optical stream 211 and the second optical stream 212 may be approximately 130 GHz. It is to be understood that the optical channel numbers described herein may enumerate consecutive optical channels within the optical input source $OS_{in}$, and are not intended to limit any particular optical channel to any particular frequency or wavelength. In other implementations, the first optical stream 211 may include the even numbered optical channels of the optical input source $OS_{in}$, and the second optical stream 212 may include the odd numbered optical channels of the optical input source $OS_{in}$.

The channel de-interleaver 220(1) may separate the first optical stream 211 to generate a first separated optical stream 221 and a second separated optical stream 222. In some implementations, the first separated optical stream 221 may include a first set of alternating channels of the first optical stream 211, and the second separated optical stream 222 may include a second set of alternating channels of the first optical stream 211. In other implementations, the first separated optical stream 221 may include the second set of alternating channels of the first optical stream 211, and the second separated optical stream 222 may include the first set of alternating channels of the first optical stream 211. In this manner, each of the first separated optical stream 221 and the second separated optical stream 222 may include alternate optical channels of the first optical stream 211, which in turn may allow the channel spacing within each of the first separated optical stream 221 and the second separated optical stream 222 to be twice the channel spacing of the first optical stream 211. Thus, for implementations in which the channel spacing of the first optical stream 211 is approximately 130 GHz, the channel spacing within each of the first separated optical stream 221 and the second separated optical stream 222 may be approximately 260 GHz.

Similarly, the channel de-interleaver 220(2) may separate the second optical stream 212 to generate a third separated optical stream 223 and a fourth separated optical stream 224. In some implementations, the third separated optical stream 223 may include a first set of alternating channels of the second optical stream 212, and the fourth separated optical stream 224 may include a second set of alternating channels of the second optical stream 212. In other implementations, the third separated optical stream 223 may include the second set of alternating channels of the second optical stream 212, and the fourth separated optical stream 224 may include the first set of alternating channels of the second optical stream 212. In this manner, each of the third separated optical stream 223 and the fourth separated optical stream 224 may include alternate optical channels of the second optical stream 212, which in turn may allow the channel spacing within each of the third separated optical stream 223 and the fourth separated optical stream 224 to be twice the channel spacing of the second optical stream 212. Thus, for implementations in which the channel spacing of the second optical stream 212 is approximately 130 GHz, the channel spacing within each of the third separated optical stream 223 and the fourth separated optical stream 224 may be approximately 260 GHz.

In some implementations, each of the MRM arrays 230(1)-230(4) may include a plurality of micro-ring modulators (not shown in FIG. 2A for simplicity) configured to modulate an associated optical signal with data from a corresponding data stream. The micro-ring modulators provided within the MRM arrays 230(1)-230(4) may be silicon-based optical devices that can modulate an optical channel (e.g., a specific wavelength of light) with data from a corresponding data stream. In some aspects, each of the micro-ring modulators may be characterized by a free spectral range (FSR), which is the separation (in wavelength or frequency) between the adjacent resonances, that defines a range of wavelengths or frequencies within which the optical channels can be accommodated. In some aspects, each of the MRM arrays 230(1)-230(4) may have a modulation rate of approximately 56 Gbps. Thus, each of the micro-ring modulators may only modulate optical channels having wavelengths within the micro-ring modulator's FSR. For example, a micro-ring modulator having a radius of 5 microns may have an FSR equal to approximately 13.5 nm. The Q-factor (or width of the resonance) of the micro-ring, which is dictated by the target channel symbol rate, sets a minimum channel spacing. For example, with symbol rate of approximately 56 Gbps, this channel spacing may be 1.5 nm for an optical wavelength near 1310 nm (or in the O-band). In this scenario, each MRM array 230 may only accommodate eight wavelengths. As described in more detail below, the optical modulation circuit 200 may separate the optical channels within the optical input source $OS_{in}$ in a manner that may allow the above-referenced micro-ring modulator to concurrently modulate up to sixteen optical channels, rather than the conventional limit of eight optical channels.

As depicted in FIG. 2A, the data streams may be provided to the MRM arrays 230(1)-230(4) as respective data sets DS1-DS4, for example, such that each of the data sets DS1-DS4 includes a plurality of unique data streams. In some implementations, each of the data sets DS1-DS4 may include up to eight unique data streams, and thus the four MRM arrays 230(1)-230(4) may collectively modulate up to thirty-two unique data streams onto the optical signals 221-224 generated by the channel de-interleavers 220(1)-220(2). In such implementations, each of the MRM arrays 230(1)-230(4) may include eight micro-ring modulators (not shown for simplicity), each modulator is configured to modulate one optical channel with data from a corresponding data stream.

The first MRM array 230(1) may receive the first separated optical stream 221 and a first data set DS1 containing eight unique data streams. Each of the eight micro-ring modulators provided in the first MRM array 230(1) may modulate one of the optical channels within the first separated optical stream 221 with data from a corresponding one of the eight data streams contained in the first data set DS1, for example, to generate a first modulated optical stream 231 that includes eight modulated optical channels. In some implementations, the first modulated optical stream 231 may inherit the channel spacing of approximately 260 GHz from the first separated optical stream 221.

The second MRM array 230(2) may receive the second separated optical stream 222 and a second data set DS2 containing eight unique data streams. Each of the eight micro-ring modulators provided in the second MRM array 230(2) may modulate one of the optical channels within the second separated optical stream 222 with data from a corresponding one of the eight data streams contained in the second data set DS2, for example, to generate a second modulated optical stream 232 that includes eight modulated optical channels. In some implementations, the second modulated optical stream 232 may inherit the channel spacing of approximately 260 GHz from the second separated optical stream 222.

The third MRM array 230(3) may receive the third separated optical stream 223 and a third data set DS3 containing eight unique data streams. Each of the eight micro-ring modulators provided in the third MRM array 230(3) may modulate one of the optical channels within the third separated optical stream 223 with data from a corresponding one of the eight data streams contained in the third data set DS3, for example, to generate a third modulated optical stream 233 that includes eight modulated optical channels. In some implementations, the third modulated optical stream 233 may inherit the channel spacing of approximately 260 GHz from the third separated optical stream 223.

The fourth MRM array 230(4) may receive the fourth separated optical stream 224 and a fourth data set DS4 containing eight unique data streams. Each of the eight micro-ring modulators provided in the fourth MRM array 230(4) may modulate one of the optical channels within the fourth separated optical stream 224 with data from a corresponding one of the eight data streams contained in the fourth data set DS4, for example, to generate a fourth modulated optical stream 234 that includes eight modulated optical channels. In some implementations, the fourth modulated optical stream 234 may inherit the channel spacing of approximately 260 GHz from the fourth separated optical stream 224.

In some implementations, each of the first separated optical stream 221, the second separated optical stream 222, the third separated optical stream 223, and the fourth separated optical stream 224 may be a wavelength division and multiplexing (WDM) optical stream, as described in more detail below. Further, in some implementations, the modulated optical channels in the first modulated optical stream 231 and the second modulated optical stream 232 may be offset from each other based on the wavelengths of each optical channel, for example, as determined by operations of the first channel de-interleaver 210 and the second channel de-interleaver 220(1). Similarly, the modulated optical channels in the third modulated optical stream 233 and the fourth modulated optical stream 234 may be offset from each other based on the wavelengths of each optical channel, for example, as determined by operations of the first channel de-interleaver 210 and the third channel de-interleaver 220(2).

The first optical interleaver 240(1) may combine the first modulated optical stream 231 and the second modulated optical stream 232 to generate the first optical output stream $OS_{out1}$, which may include the sixteen odd optical channels of the optical input source $OS_{in}$ modulated by respective ones of the sixteen data streams associated with the first and second data sets DS1-DS2. In some implementations, the channel offsets between the first and second modulated optical streams 231-232 may allow their respective channels to be interleaved with each other to generate the first optical output stream $OS_{out1}$, for example, with minimal crosstalk between modulated channels. As a result, the channel spacing between the optical channels of the first optical output stream $OS_{out1}$ may be approximately 130 GHz. In some aspects, the first optical output stream $OS_{out1}$ may be referred to as a dense wavelength division and multiplexing (DWDM) optical stream.

Similarly, the second optical interleaver 240(2) may combine the third modulated optical stream 233 and the fourth modulated optical stream 234 to generate the second optical output stream $OS_{out2}$, which may include the sixteen even optical channels of the optical input source $OS_{in}$ modulated by respective ones of the sixteen data streams associated with the third and fourth data sets D53-D54. In some implementations, the channel offsets between the third and fourth modulated optical streams 233-234 may allow their respective channels to be interleaved with each other to generate the second optical output stream $OS_{out2}$, for example, with minimal (if any) crosstalk between modulated channels. As a result, the channel spacing between the optical channels of the second optical output stream $OS_{out2}$ may be approximately 130 GHz. In some aspects, the second optical output stream $OS_{out2}$ may be referred to as a DWDM optical stream.

Figure 2B:
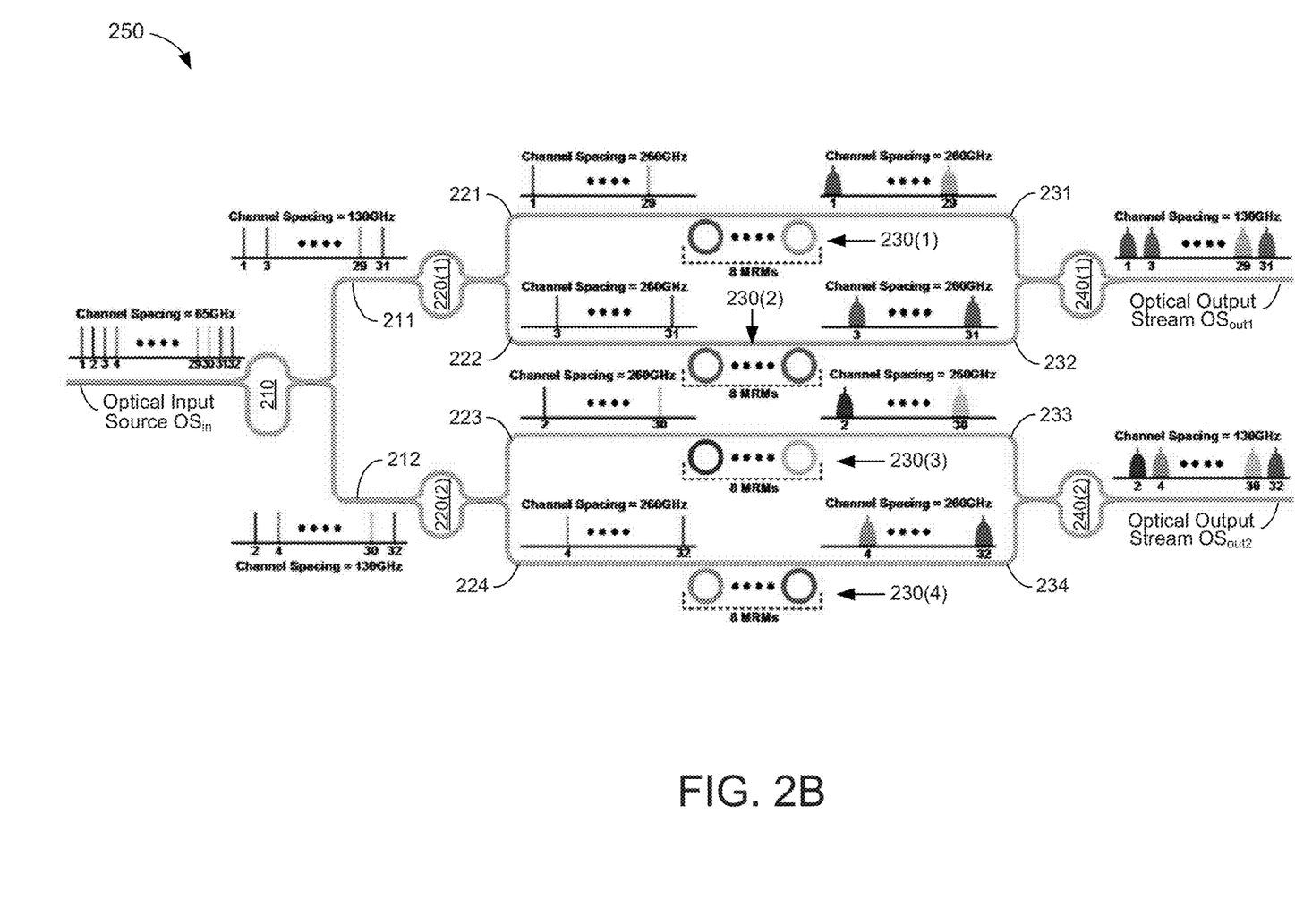
FIG. 2B is a functional illustration depicting an example operation of the optical modulation circuit of FIG. 2A, in accordance with some implementations.

FIG. 2B is a functional illustration 250 depicting an example operation of the optical modulation circuit 200 of FIG. 2A, in accordance with some implementations. The optical light source $OS_{in}$, which includes thirty-two channels separated by a channel spacing of 65 GHz, is split by the channel de-interleaver 210 to generate optical signals 211 and 212. The first optical signal 211 includes the sixteen odd channels of the optical input source $OS_{in}$ and has a channel spacing of 130 GHz, and the second optical signal 212 includes the sixteen even channels of the optical input source $OS_{in}$ and has a channel spacing of 130 GHz. The first optical signal 211 is split by the channel de-interleaver 220(1) to generate optical signals 221 and 222, and the second optical signal 212 is split by the channel de-interleaver 220(2) to generate optical signals 223 and 224. Each of the optical signals 221-224 includes eight channels separated by a channel spacing of 260 GHz, for example, such that each of the optical signals 221-224 includes one-fourth of the optical channels of the optical input source $OS_{in}$.

Each of the eight channels of optical signal 221 is modulated with a unique data stream by the first MRM array 230(1) to generate the first modulated optical signal 231, each of the eight channels of optical signal 222 is modulated with a unique data stream by the second MRM array 230(2) to generate the second modulated optical signal 232, each of the eight channels of optical signal 223 is modulated with a unique data stream by the third MRM array 230(3) to generate the third modulated optical signal 233, and each of the eight channels of optical signal 224 is modulated with a unique data stream by the fourth MRM array 230(4) to generate the fourth modulated optical signal 234. The modulated optical signals 231 and 232, each including eight modulated optical channels separated by a channel spacing of 260 GHz, are combined in the first optical interleaver 240(1) to generate the first optical output stream $OSC_{out1}$. Similarly, the modulated optical signals 233 and 234, each including eight modulated optical channels separated by a channel spacing of 260 GHz, are combined in the second optical interleaver 240(2) to generate the second optical output stream $OSC_{out2}$. The first and second optical output streams $OSC_{out1}$ and $OSC_{out2}$ each include sixteen channels of modulated data, with adjacent channels separated by a channel spacing of 130 GHz. As such, the channel spacing of the first and second optical output streams $OSC_{out1}$ and $OSC_{out2}$ is twice the channel spacing the optical input source $OS_{in}$.

Figure 3:
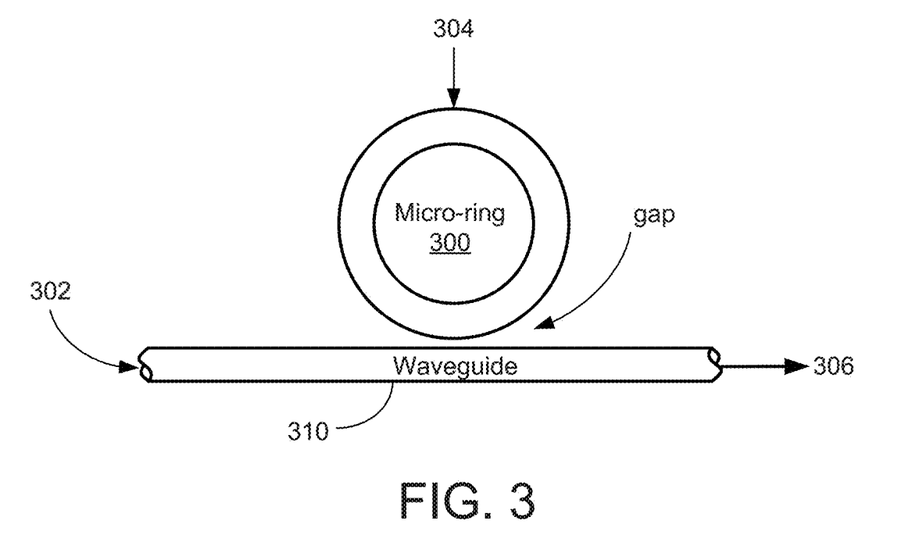
FIG. 3 is a simplified block diagram of a micro-ring modulator, in accordance with some implementations.

FIG. 3 is a simplified block diagram of a micro-ring modulator 300, in accordance with some implementations. The micro-ring modulator 300, which may be one example of the micro-ring modulators provided within each of the MRM arrays 230(1)-230(4) of FIG. 2A, may be coupled to a waveguide 310 that receives an optical input source 302 having one or more optical wavelengths. In some implementations, the micro-ring modulator 300 may be configured to modulate a particular wavelength of light that corresponds to one optical channel. For example, the optical input source 302 may include an optical channel having a wavelength λ, and the micro-ring modulator 300 may be configured to modulate the λ-based optical channel with data 304 to generate a modulated optical output signal 306 that can be propagated through the waveguide 310.

The micro-ring modulator 300 may be characterized by an FSR that specifies a range of operating wavelengths, and an array of micro-ring modulators 300 may be configured to modulate various wavelengths within the FSR. In some implementations, the micro-ring modulator 300 may be configured to modulate the wavelength λ based on the nominal diameter of the micro-ring modulator 300. A heating element (not shown for simplicity) may be used to selectively tune the micro-ring modulator 300 for the wavelength λ.

In some implementations, the micro-ring modulator 300 may be silicon-based, may be designed to operate at wavelengths around 1310 nm, which corresponds to 229 THz, may have a radius of approximately 5 microns, and may have an FSR of approximately 13.5 nm. The micro-ring modulator may be designed to operate above 50 GBd. As a result, the operating characteristics of the micro-ring modulator 300 may be well-suited for the channel spacings of the optical streams 221-224 generated by the pair of channel de-interleavers 220(1)-220(2). In other implementations, the micro-ring modulator 300 may have other suitable operating characteristics. For example, in at least one other implementation, the micro-ring modulator 300 may operate at wavelengths other than 1310 nm.

Figure 4:
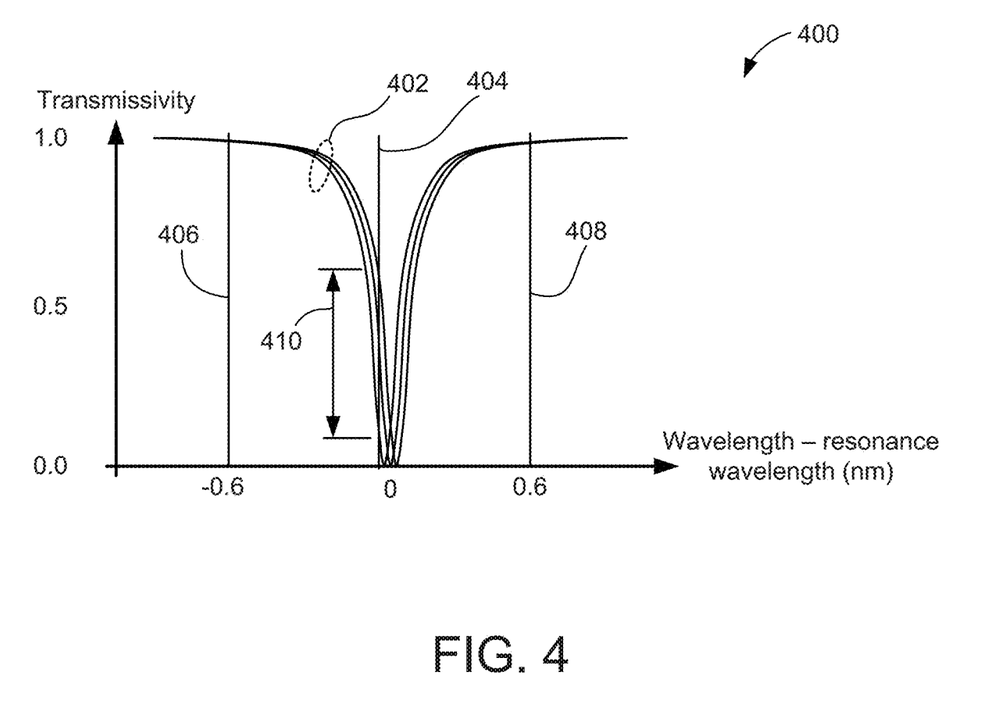
FIG. 4 is an example graph depicting example characteristics of the micro-ring modulator of FIG. 3, in accordance with some implementations.

FIG. 4 is an example graph 400 depicting example characteristics of the micro-ring modulator 300, in accordance with some implementations. The graph 400 shows light output (transmissivity) as a function of wavelength (normalized to 1 when wavelength is significantly deviated from resonance) for a plurality of transmission curves 402 associated with the micro-ring modulator 300 of FIG. 3. The transmission is close to zero when the wavelength is at the resonance of the micro-ring. The transmission curves 402 illustrate the manner in which light may be modulated by the micro-ring modulator 300. For example, a wavelength corresponding to an optical channel modulated by the micro-ring modulator 300 is shown by a line 404. The transmissivity may be adjusted (e.g., modulated) over a range 410 relative to the wavelength of the optical channel represented by the line 404, for example, by varying the voltage across the pn junction imbedded in the ring's waveguide.

Wavelengths associated with adjacent optical channels are also shown in the graph 400. For example, a line 406 may indicate a first wavelength that can be associated with an adjacent optical channel having a smaller wavelength, and a line 408 may indicate a second wavelength that can be associated with an adjacent optical channel having a larger wavelength. In some implementations, the spacing between adjacent optical channels may be based at least in part on cross talk detected on the adjacent channels. In addition, or in the alternative, the spacing between adjacent optical channels may be based at least in part on a loss of transmissivity caused by other micro-ring modulators.

Figure 5:
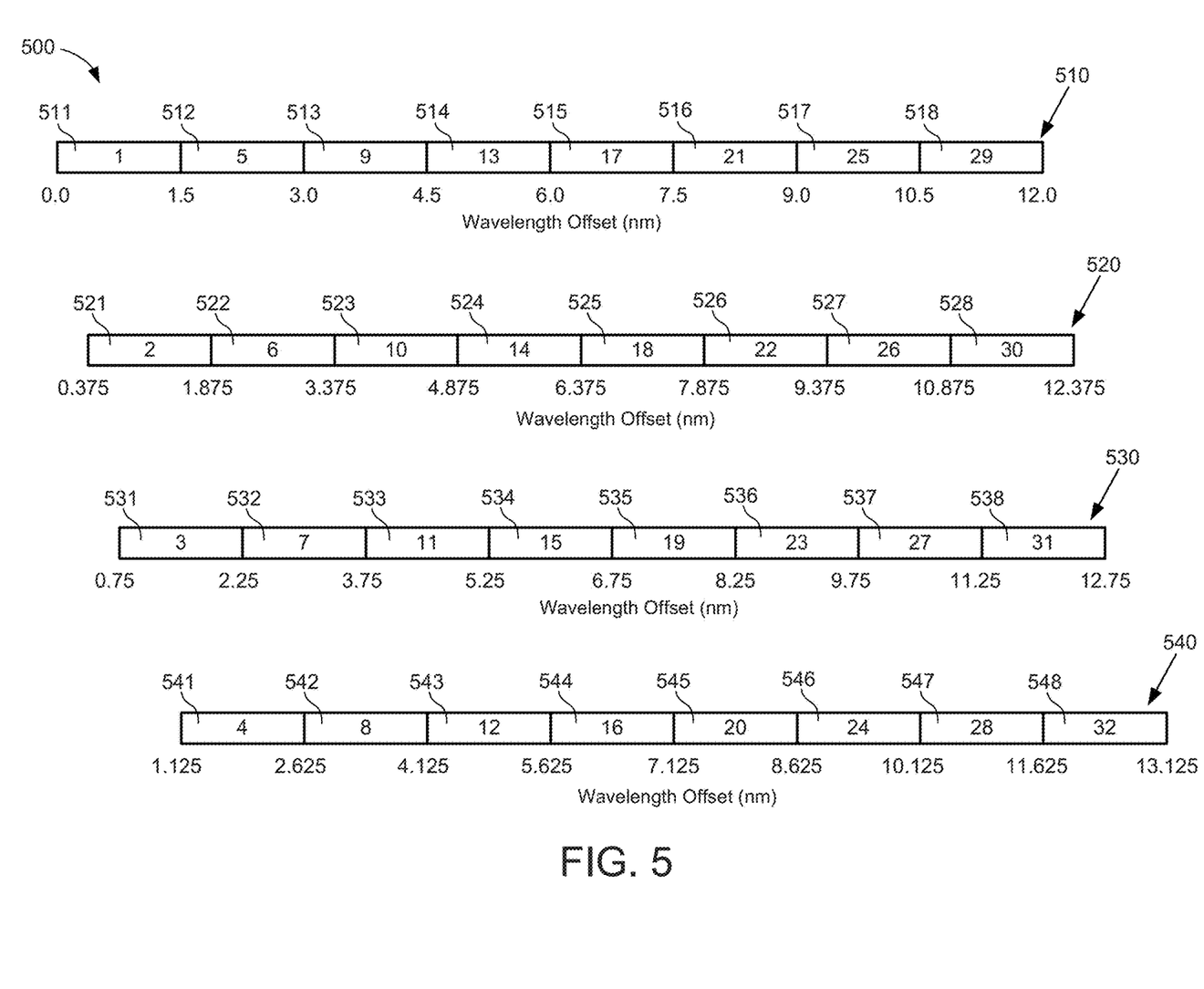
FIG. 5 is a chart of example channel assignments for the optical modulation circuit of FIG. 2A, in accordance with some implementations.

FIG. 5 is a chart 500 of example channel assignments for the optical modulation circuit 200 of FIG. 2A, in accordance with some implementations. The example chart 500 is based on each of the MRM arrays 230(1)-230(4) of the optical modulation circuit 200 including a plurality of micro-ring modulators 300 each having an FSR of 13.5 nm, and thus the channel assignments depicted in the chart 500 may fit within the FSR of 13.5 nm. It is to be understood that other channel assignments are possible for other FSRs.

A first channel assignment 510 includes eight channels 511-518, each having a channel separation (e.g., a channel spacing) of approximately 1.5 nm with a wavelength around 1310 nm. The channels 511-518 may be offset relative to any arbitrary wavelength, and adjacent channels may be offset by 1.5 nm. In some aspects, the channel spacing of 1.5 nm may correspond to the channel spacing of 260 GHz at 1310 nm described above with respect to the optical streams 221-224 and the modulated optical streams 231-234 of FIG. 2A. For the example of FIG. 5, the first channel 511 has a channel offset of 0 nm, the second channel 512 has a channel offset of 1.5 nm, the third channel 513 has a channel offset of 3.0 nm, and so on, and the eighth channel 518 has a channel offset of 10.5 nm. The first channel assignment 510 also includes optical channel number assignments which correspond to the optical channel numbers described above with respect to FIG. 2A. For example, the first channel 511 may correspond to optical channel 1, the second channel 512 may correspond to optical channel 5, the third channel 513 may correspond to optical channel 9, and so on, and the eighth channel 518 may correspond to optical channel 29. In some implementations, the first channel assignment 510 may correspond to the first split optical stream 221 of FIG. 2A, and the first MRM array 230(1) may be configured to modulate the optical channels indicated in the first channel assignment 510.

A second channel assignment 520 includes eight channels 521-528, each having a channel width (e.g., a channel spacing) of approximately 1.5 nm. Adjacent channels may be offset by 1.5 nm, which may correspond to the channel spacing of 260 GHz described above with respect to FIG. 2A. For the example of FIG. 5, the first channel 521 has a channel offset of 0.375 nm, the second channel 522 has a channel offset of 1.875 nm, the third channel 523 has a channel offset of 3.375 nm, and so on, and the eighth channel 528 has a channel offset of 10.875 nm. The second channel assignment 520 also includes optical channel number assignments which correspond to the optical channel numbers described above with respect to FIG. 2A. For example, the first channel 521 may correspond to optical channel 2, the second channel 522 may correspond to optical channel 6, the third channel 523 may correspond to optical channel 10, and so on, and the eighth channel 528 may correspond to optical channel 30. In some implementations, the second channel assignment 520 may correspond to the second split optical stream 222 of FIG. 2A, and the second MRM array 230(2) may be configured to modulate the optical channels indicated in the second channel assignment 520.

A third channel assignment 530 includes eight channels 531-538, each having a channel width (e.g., a channel spacing) of approximately 1.5 nm. Adjacent channels may be offset by 1.5 nm, which may correspond to the channel spacing of 260 GHz described above with respect to FIG. 2A. For the example of FIG. 5, the first channel 531 has a channel offset of 0.75 nm, the second channel 532 has a channel offset of 2.25 nm, the third channel 533 has a channel offset of 3.75 nm, and so on, and the eighth channel 534 has a channel offset of 11.25 nm. The third channel assignment 530 also includes optical channel number assignments which correspond to the optical channel numbers described above with respect to FIG. 2A. For example, the first channel 531 may correspond to optical channel 3, the second channel 532 may correspond to optical channel 7, the third channel 533 may correspond to optical channel 11, and so on, and the eighth channel 538 may correspond to optical channel 31. In some implementations, the third channel assignment 530 may correspond to the third split optical stream 223 of FIG. 2A, and the third MRM array 230(3) may be configured to modulate the optical channels indicated in the third channel assignment 530.

A fourth channel assignment 540 includes eight channels 541-548, each having a channel width (e.g., a channel spacing) of approximately 1.5 nm. Adjacent channels may be offset by 1.5 nm, which may correspond to the channel spacing of 260 GHz described above with respect to FIG. 2A. For the example of FIG. 5, the first channel 541 has a channel offset of 1.125 nm, the second channel 542 has a channel offset of 2.625 nm, the third channel 543 has a channel offset of 4.125 nm, and so on, and the eighth channel 548 has a channel offset of 11.625 nm. The fourth channel assignment 540 also includes optical channel number assignments which correspond to the optical channel numbers described above with respect to FIG. 2A. For example, first channel 541 may correspond to optical channel 4, the second channel 542 may correspond to optical channel 8, the third channel 543 may correspond to optical channel 12, and so on, and the eighth channel 548 may correspond to optical channel 32. In some implementations, the fourth channel assignment 540 may correspond to the fourth split optical stream 224 of FIG. 2A, and the fourth MRM array 230(4) may be configured to modulate the optical channels indicated in the fourth channel assignment 540.

Persons skilled in the art will recognize that the channel widths and channel offsets described with respect to the channel assignments 510, 520, 530, and 540 are illustrative and not meant to be limiting. Other channel widths and offsets are possible. For example, other channel widths are feasible provided that cross-talk and insertion losses associated with these channel widths have little or no effect on adjacent channels. Further, other channel widths and offsets are feasible provided the channel assignments for eight adjacent channels remain with the FSR of the associated micro-ring modulators.

Figure 6:
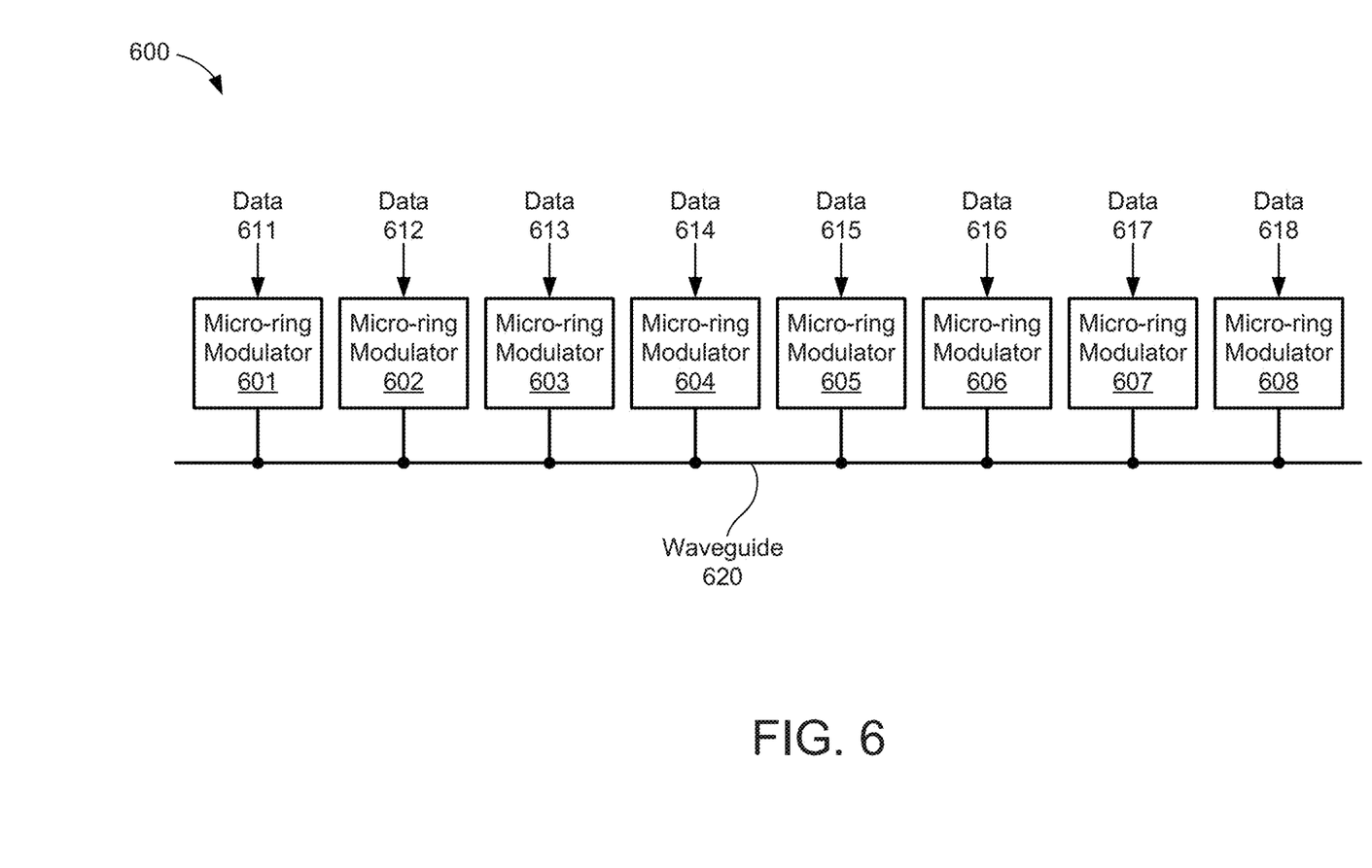
FIG. 6 is a block diagram of an example micro-ring modulation array, in accordance with some implementations.

FIG. 6 is a block diagram of an example MRM array 600, in accordance with some implementations. The MRM array 600 may be an example of one or more of the MRM arrays 230(1)-230(4) of FIG. 2A. The MRM array 600 may include eight micro-ring modulators 601-608 and a waveguide 620. Each of the micro-ring modulators 601-608 may include an input to receive a respective one of eight data streams 611-618, and may include an output coupled to the waveguide 620. For example, the first micro-ring modulator 601 may receive the first data stream 611, the second micro-ring modulator 602 may receive the second data stream 612, and so on, and the eighth micro-ring modulator 608 may receive the eighth data stream 618. For purposes of discussion herein, each of the micro-ring modulators 601-608 may be silicon-based, may have an FSR of at approximately 13.5 nm, and may have a radius of approximately 5 microns.

In some implementations, the MRM array 600 may be configured to modulate optical channels in accordance with one of the channel assignments depicted in FIG. 5. In some aspects, the MRM array 600 may be configured to modulate optical channels of the first split optical stream 221 by configuring the micro-ring modulators 601-608 to modulate optical channels in accordance with the first channel assignment 510. For example, the first micro-ring modulator 601 may be configured to modulate optical channel 1, the second micro-ring modulator 602 may be configured to modulate optical channel 5, and so on, and the eighth micro-ring modulator 608 may be configured to modulate optical channel 29.

In other aspects, the MRM array 600 may be configured to modulate optical channels of the second split optical stream 222 by configuring the micro-ring modulators 601-608 to modulate optical channels in accordance with the second channel assignment 520. For example, the first micro-ring modulator 601 may be configured to modulate optical channel 2, the second micro-ring modulator 602 may be configured to modulate optical channel 6, and so on, and the eighth micro-ring modulator 608 may be configured to modulate optical channel 30.

In other aspects, the MRM array 600 may be configured to modulate optical channels of the third split optical stream 223 by configuring the micro-ring modulators 601-608 to modulate optical channels in accordance with the third channel assignment 530. For example, the first micro-ring modulator 601 may be configured to modulate optical channel 3, the second micro-ring modulator 602 may be configured to modulate optical channel 7, and so on, and the eighth micro-ring modulator 608 may be configured to modulate optical channel 31.

In other aspects, the MRM array 600 may be configured to modulate optical channels of the fourth split optical stream 224 by configuring the micro-ring modulators 601-608 to modulate optical channels in accordance with the fourth channel assignment 540. For example, the first micro-ring modulator 601 may be configured to modulate optical channel 4, the second micro-ring modulator 602 may be configured to modulate optical channel 8, and so on, and the eighth micro-ring modulator 608 may be configured to modulate optical channel 32.

Figure 7:
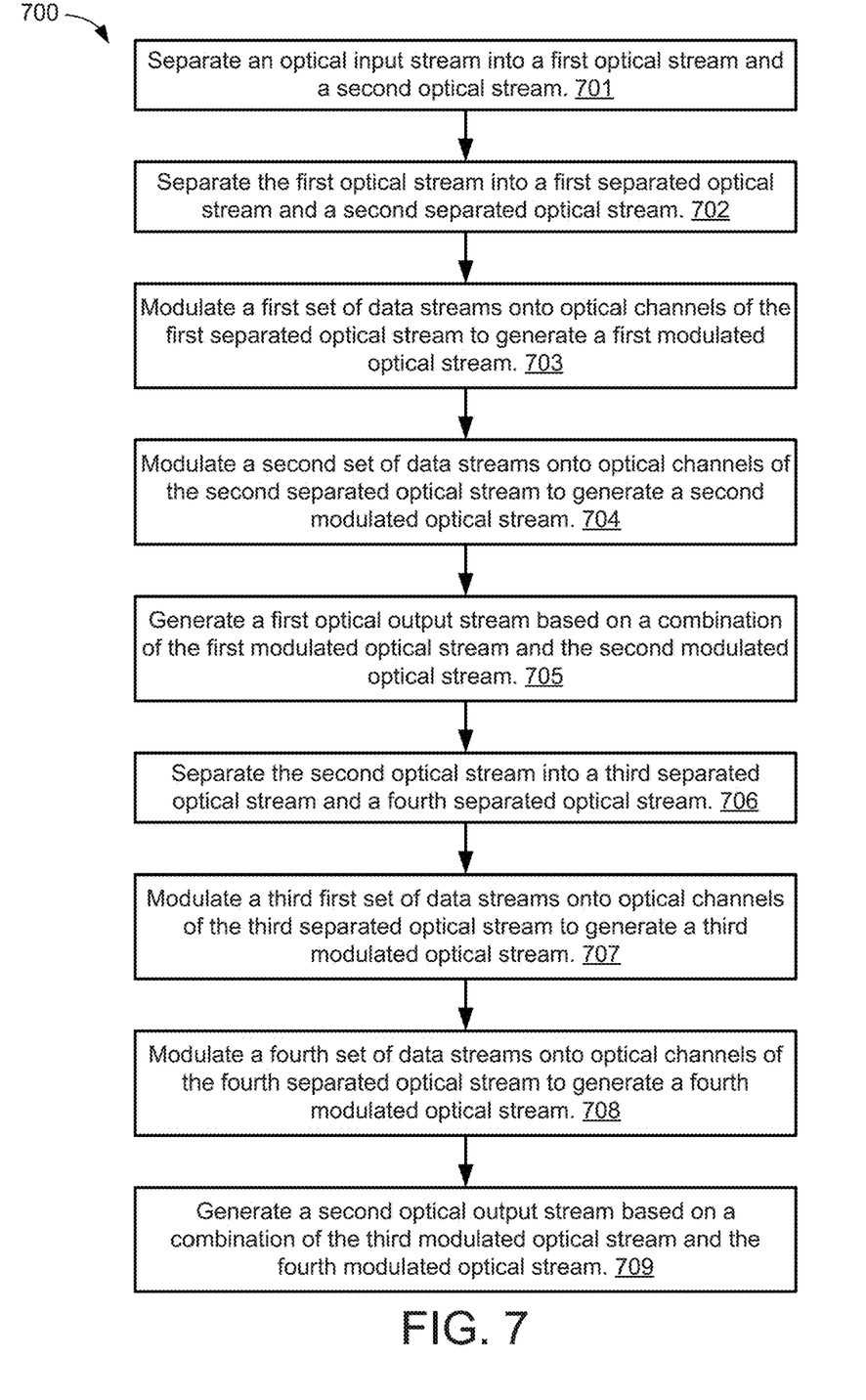
FIG. 7 is an illustrative flow chart depicting an example operation for generating an optical output, in accordance with some implementations.

FIG. 7 shows an illustrative flow chart depicting an example operation 700 for generating an optical output, in accordance with some implementations. Although described herein as being performed by the optical modulation circuit 200 of FIG. 2A, the operation 700 may be performed by any technically feasible processor, device, hardware platform, or the like.

The optical modulation circuit 200 may separate an optical input source into a first optical stream and a second optical stream (701). In some implementations, the optical input source $OS_{in}$ may be separated into the first optical stream 211 and the second optical stream 212 using the channel de-interleaver 210. In some aspects, the first optical stream 211 may include odd numbered optical channels of the optical input source $OS_{in}$, and the second optical stream 212 may include even numbered optical channels of the optical input source $OS_{in}$.

The optical modulation circuit 200 may separate the first optical stream into a first separated optical stream and a second separated optical stream (702). In some implementations, the first optical stream 211 may be separated into the first separated optical stream 221 and the second separated optical stream 222 using the channel de-interleaver 220(1). In some aspects, the first separated optical stream 221 may include a first set of alternating optical channels of the first optical stream 211, and the second separated optical stream 222 may include a second set of alternating optical channels of the first optical stream 211, where the second set of alternating optical channels is different than the first set of alternating channels.

The optical modulation circuit 200 may modulate a first set of data streams onto optical channels of the first separated optical stream to generate a first modulated optical stream (703), and may modulate a second set of data streams onto optical channels of the second separated optical stream to generate a second modulated optical stream (704). In some implementations, the first MRM array 230(1) may modulate data streams associated with the first data set DS1 onto optical channels of the first separated optical stream 221 to generate the first modulated optical stream 231, and the second MRM array 230(2) may modulate data streams associated with the second data set DS2 onto optical channels of the second separated optical stream 222 to generate the second modulated optical stream 232.

The optical modulation circuit 200 may generate a first optical output stream based on a combination of the first modulated optical stream and the second modulated optical stream (705). In some implementations, the first channel interleaver 240(1) may combine the first modulated optical stream 231 and the second modulated optical stream 232 to generate the first optical output stream $OS_{out1}$.

The optical modulation circuit 200 may separate the second optical stream into a third separated optical stream and a fourth separated optical stream (706). In some implementations, the second optical stream 212 may be separated into the third separated optical stream 223 and the fourth split optical stream 224 using the channel de-interleaver 220(2). In some aspects, the third separated optical stream 223 may include a first set of alternating optical channels of the second optical stream 212, and the fourth separated optical stream 224 may include a second set of alternating optical channels of the second optical stream 212, where the second set of alternating optical channels is different than the first set of alternating channels.

The optical modulation circuit 200 may modulate a third set of data streams onto optical channels of the third separated optical stream to generate a third modulated optical stream (707), and may modulate a fourth set of data streams onto optical channels of the fourth separated optical stream to generate a fourth modulated optical stream (708). In some implementations, the third MRM array 230(3) may modulate data streams associated with the third data set DS3 onto optical channels of the third separated optical stream 223 to generate the third modulated optical stream 233, and the fourth MRM array 230(4) may modulate data streams associated with the fourth data set DS4 onto optical channels of the fourth separated optical stream 224 to generate the fourth modulated optical stream 234.

The optical modulation circuit 200 may generate a second optical output stream based on a combination of the third modulated optical stream and the fourth modulated optical stream (709). In some implementations, the second optical combiner 240(2) may combine the third modulated optical stream 233 and the fourth modulated optical stream 234 to generate the second optical output stream $OS_{out2}$.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example implementations have been described with reference to specific example implementations thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An optical modulation circuit, comprising:
    an input terminal to receive an optical input source including a plurality of optical channels or wavelengths;
    a first channel de-interleaver configured to separate the optical input source into first and second optical streams;
    a second channel de-interleaver configured to separate the first optical stream into first and second separated optical streams;
    a first micro-ring modulation (MRM) array configured to modulate a first set of data streams onto optical channels of the first separated optical stream to generate a first modulated optical stream;
    a second MRM array configured to modulate a second set of data streams onto optical channels of the second separated optical stream to generate a second modulated optical stream; and
    a first optical interleaver configured to generate a first optical output stream based on the first and second modulated optical streams.

2. The optical modulation circuit of claim 1, wherein the first optical stream includes odd numbered optical channels of the optical input source, and the second optical stream includes even numbered optical channels of the optical input source.

3. The optical modulation circuit of claim 1, wherein the first separated optical stream includes a first set of alternating optical channels of the first optical stream, and the second separated optical stream includes a second set of alternating optical channels of the first optical stream, wherein the first set of alternating optical channels is different than the second set of alternating optical channels.

4. The optical modulation circuit of claim 1, wherein:
    the first MRM array comprises a first plurality of micro-ring modulators each configured to modulate an associated one of the first set of data streams onto a corresponding optical channel of the first separated optical stream; and the second MRM array comprises a second plurality of micro-ring modulators each configured to modulate an associated one of the second set of data streams onto a corresponding optical channel of the second separated optical stream.

5. The optical modulation circuit of claim 4, wherein each of the first and second pluralities of micro-ring modulators has a free spectral range of at least 13.5 nm and a radius about 5 microns.

6. The optical modulation circuit of claim 1, wherein the optical input source has a channel spacing of approximately 65 GHz, each of the first and second optical streams has a channel spacing of twice the channel spacing of the optical input source or approximately 130 GHz, each of the first and second modulated optical streams has a channel spacing of four times the channel spacing of the optical input source or approximately 260 GHz, and the first optical output stream has a channel spacing of twice the channel spacing of the optical input source or approximately 130 GHz.

7. The optical modulation circuit of claim 6, wherein the optical input source includes 32 optical channels, each of the first and second optical streams includes 16 optical channels, each of the first and second modulated optical streams includes 8 optical channels, and the first optical output stream includes 16 optical channels.

8. The optical modulation circuit of claim 1, further comprising:
a third channel de-interleaver configured to separate the second optical stream into third and fourth separated optical streams;
a third MRM array configured to modulate a third set of data streams onto optical channels of the third separated optical stream to generate a third modulated optical stream;
a fourth MRM array configured to modulate a fourth set of data streams onto optical channels of the fourth separated optical stream to generate a fourth modulated optical stream; and
a second optical interleaver configured to generate a second optical output stream based on the third and fourth modulated optical streams.

9. The optical modulation circuit of claim 8, wherein the third separated optical stream includes a first set of alternating optical channels of the second optical stream, and the fourth separated optical stream includes a second set of alternating optical channels of the second optical stream, wherein the first set of alternating optical channels is different than the second set of alternating optical channels.

10. The optical modulation circuit of claim 8, wherein:
the third MRM array comprises a plurality of micro-ring modulators each configured to modulate an associated one of the third set of data streams onto a corresponding optical channel of the third separated optical stream; and
the fourth MRM array comprises a plurality of micro-ring modulators each configured to modulate an associated one of the fourth set of data streams onto a corresponding optical channel of the fourth separated optical stream.

11. A photonics integrated circuit, comprising:
an input terminal to receive an optical input source including a plurality of optical channels or wavelengths;
a number of optical modulation circuits coupled to the input terminal; and a number of optical detection circuits coupled to the input terminal, wherein each of the optical modulation circuits comprises:
a first channel de-interleaver configured to separate the optical input source into first and second optical streams;
a second channel de-interleaver configured to separate the first optical stream into first and second separated optical streams;
a third channel de-interleaver configured to separate the second optical stream into third and fourth separated optical streams;
a plurality of micro-ring modulation (MRM) arrays each configured to modulate a unique set of data streams onto optical channels of a corresponding one of the separated optical streams to generate a respective one of a first modulated optical stream, a second modulated optical stream, a third modulated optical stream, and a fourth modulated optical stream;
a first optical interleaver configured to generate a first optical output stream based on the first and second modulated optical streams; and
a second optical interleaver configured to generate a second optical output stream based on the third and fourth modulated optical streams.

12. The photonics integrated circuit of claim 11, wherein the first optical stream includes odd numbered optical channels of the optical input source, and the second optical stream includes even numbered optical channels of the optical input source.

13. The photonics integrated circuit of claim 11, wherein:
the first separated optical stream includes a first set of alternating optical channels of the first optical stream;
the second separated optical stream includes a second set of alternating optical channels of the first optical stream;
the third separated optical stream includes a first set of alternating optical channels of the second optical stream; and
the fourth separated optical stream includes a second set of alternating optical channels of the second optical stream.

14. The photonics integrated circuit of claim 11, wherein each of the plurality of MRM arrays comprises a number of micro-ring modulators configured to modulate an associated one of the unique data streams onto a corresponding one of the separated optical streams.

15. The photonics integrated circuit of claim 11, wherein the optical input source has a channel spacing of approximately 65 GHz, each of the first and second optical streams has a channel spacing of approximately 130 GHz, each of the modulated optical streams has a channel spacing of approximately 260 GHz, and each of the optical output streams has a channel spacing of approximately 130 GHz.

16. The photonics integrated circuit of claim 15, wherein the optical input source includes 32 optical channels, each of the first and second optical streams includes 16 optical channels, each of the modulated optical streams includes 8 optical channels, and each of the optical output streams includes 16 optical channels.

17. A method comprising:
separating an optical input source into a first optical stream and a second optical stream;
separating the first optical stream into a first separated optical stream and a second separated optical stream;

modulating a first set of data streams onto optical channels of the first separated optical stream to generate a first modulated optical stream;

modulating a second set of data streams onto optical channels of the second separated optical stream to generate a second modulated optical stream; and generating a first optical output stream based on a combination of the first modulated optical stream and the second modulated optical stream.

18. The method of claim 17, wherein the first optical stream includes odd numbered optical channels of the optical input source, and the second optical stream includes even numbered optical channels of the optical input source.

19. The method of claim 17, wherein the first separated optical stream includes a first set of alternating optical channels of the first optical stream, and the second separated optical stream includes a second set of alternating optical channels of the first optical stream, wherein the first set of alternating optical channels is different than the second set of alternating optical channels.

20. The method of claim 17, further comprising:

separating the second optical stream into a third separated optical stream and a fourth separated optical stream;

modulating a third first set of data streams onto optical channels of the third separated optical stream to generate a third modulated optical stream;

modulating a fourth set of data streams onto optical channels of the fourth separated optical stream to generate a fourth modulated optical stream; and generating a second optical output stream based on a combination of the third modulated optical stream and the fourth modulated optical stream.

* * * * *